(12) United States Patent
Coupard et al.

(10) Patent No.: US 12,492,647 B2
(45) Date of Patent: Dec. 9, 2025

(54) METHOD FOR PREDICTING THE WEAR OF A MECHANICAL PART, AND METHOD FOR DETERMINING THE OPERATIONAL RISK ASSOCIATED WITH AN AIRCRAFT OR WITH A FLEET OF AIRCRAFT

(71) Applicant: SAFRAN AIRCRAFT ENGINES, Paris (FR)

(72) Inventors: Josselin Xavier Coupard, Moissy Cramayel (FR); Guillaume Rémi Bonnet, Moissy Cramayel (FR); Germain Gaudart, Moissy Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 187 days.

(21) Appl. No.: 18/553,952

(22) PCT Filed: Apr. 5, 2022

(86) PCT No.: PCT/FR2022/050636
§ 371 (c)(1),
(2) Date: Oct. 4, 2023

(87) PCT Pub. No.: WO2022/214764
PCT Pub. Date: Oct. 13, 2022

(65) Prior Publication Data
US 2024/0110490 A1    Apr. 4, 2024

(30) Foreign Application Priority Data
Apr. 6, 2021 (FR) ........................ 2103478

(51) Int. Cl.
*F01D 21/00* (2006.01)
*B64F 5/60* (2017.01)

(52) U.S. Cl.
CPC .............. *F01D 21/003* (2013.01); *B64F 5/60* (2017.01); *F05D 2260/80* (2013.01); *F05D 2260/81* (2013.01)

(58) Field of Classification Search
None
See application file for complete search history.

(56) References Cited

U.S. PATENT DOCUMENTS 6,473,677 B1    10/2002  Hershey et al.
2008/0140361 A1*  6/2008  Bonissone ......... G05B 23/0283
                                                 703/2

(Continued)

FOREIGN PATENT DOCUMENTS

EP        3 410 092 A1    12/2018
WO    WO 2018/004873 A1    1/2018

OTHER PUBLICATIONS

International Search Report as issued in International Patent Application No. PCT/FR2022/050636, dated Jun. 17, 2022.

*Primary Examiner* — Hitesh Patel
*Assistant Examiner* — Wenyuan Yang
(74) *Attorney, Agent, or Firm* — Pillsbury Winthrop Shaw Pittman LLP

(57) ABSTRACT

A method for predicting the wear of a mechanical part and uncertainty of this prediction in a profile of use, the profile of use taking into account environmental conditions associated with environmental data and the time of use of the mechanical part under each of these environmental conditions, the method including determining operational data associated with a plurality of mechanical parts of the same type as the mechanical part; on the basis of the operational data determined, determining a plurality of predictive models of the wear of the part, the mechanical part being able to be divided into a plurality of elements, each element being modelled using at least one model of the plurality of models;

(Continued)

and, for each model, determining a weighting coefficient, determining a wear prediction of the mechanical part, and determining a statistical quantity representative of dispersion of the predictions of the plurality of models.

7 Claims, 4 Drawing Sheets

(56) References Cited

U.S. PATENT DOCUMENTS

| | | | |
|---|---|---|---|
| 2010/0082267 A1* | 4/2010 | Schimert | G05B 19/4065 |
| | | | 702/179 |
| 2017/0361947 A1 | 12/2017 | Kessie et al. | |
| 2020/0079532 A1* | 3/2020 | Rix | B64D 45/00 |
| 2020/0128072 A1* | 4/2020 | Trim | G06N 3/047 |
| 2020/0326698 A1* | 10/2020 | Kikuchi | G05B 13/027 |
| 2021/0109547 A1* | 4/2021 | Clark | G05D 1/0816 |
| 2021/0335137 A1* | 10/2021 | Candido | G01W 1/10 |

\* cited by examiner

[Fig. 1]
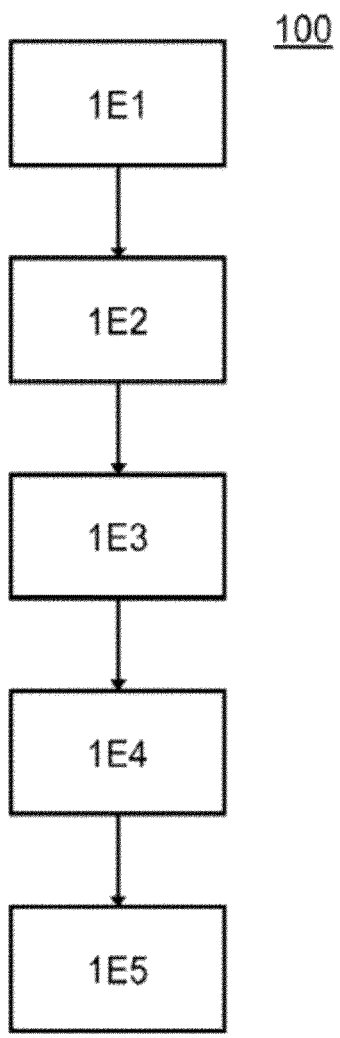

[Fig. 2]
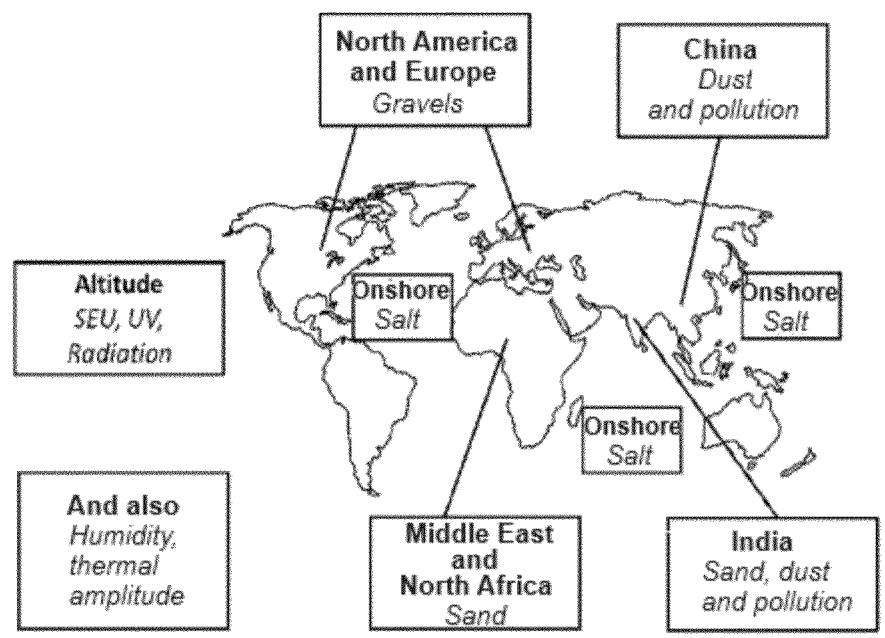

[Fig. 3]
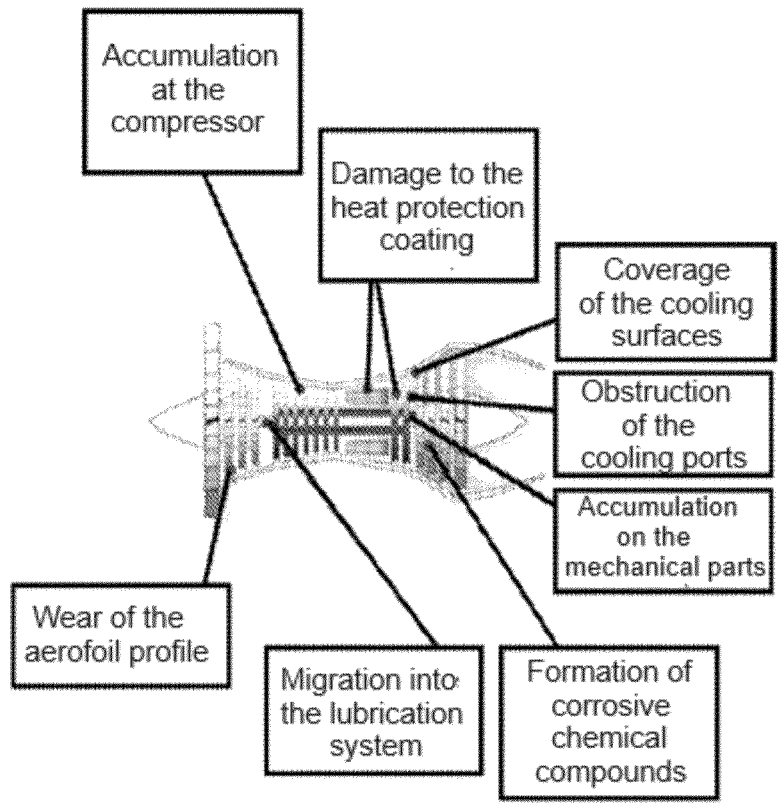
[Fig. 4]
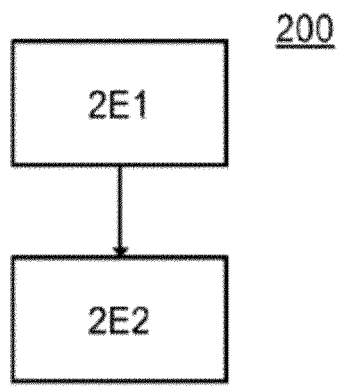

[Fig. 5]
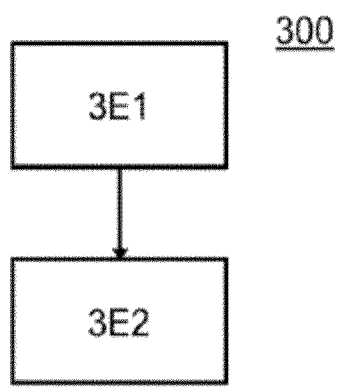

METHOD FOR PREDICTING THE WEAR OF A MECHANICAL PART, AND METHOD FOR DETERMINING THE OPERATIONAL RISK ASSOCIATED WITH AN AIRCRAFT OR WITH A FLEET OF AIRCRAFT

CROSS-REFERENCE TO RELATED APPLICATIONS

This application is the U.S. National Stage of PCT/FR2022/050636, filed Apr. 5, 2022, which in turn claims priority to French patent application number 2103478 filed Apr. 6, 2021. The content of these applications are incorporated herein by reference in their entireties.

TECHNICAL FIELD OF THE INVENTION

The technical field of the invention is that of monitoring a fleet of aircraft.

The present invention relates to a method for predicting wear of a mechanical part. It also relates to a method for determining the operational risk of an aircraft or a fleet of aircraft based on the prediction of wear of an aircraft mechanical part.

TECHNOLOGICAL BACKGROUND OF THE INVENTION

It is known to use contract data and flight data (aircraft, engines, third parties) in order to estimate parameters intrinsic to contracts related to its profitability and in particular: time under wing, direct maintenance cost (the latter includes heavy maintenance, parts and labour), engine operating cost (the latter includes fuel consumed and line maintenance), engine and equipment operational risk indicators, justification of environmental suitability and usage in relation to the terms of the contract.

It is also known to take account of the features of each flight zone. Indeed, differences between environments can modify the effects of corrosion or erosion, which will have an impact on the parts and therefore on the purchase costs associated with the parts. However, in methods of the state of the art, the profitability of contracts is not finely estimated (for example, by adopting a metric by regions of operation). In particular, the estimation of direct maintenance costs, time under wing, mean time between failures, MTBUR (Mean Time Before Unscheduled Removal), and the risk indicator is made macroscopically (based on feedback or FB). Therefore, a company has no guarantee that the contract will be profitable, and is not in a position to correctly estimate the costs and risk inherent in the contract.

However, there is no known technical solution for monitoring wear or ageing of a mechanical part, such as an aircraft turbomachine.

There is therefore a need for a method for accurately determining ageing of a mechanical part and the operational risk associated with such ageing for a plurality of mechanical parts or even a fleet of aircraft.

SUMMARY OF THE INVENTION

The invention offers a solution to the problems previously discussed, by making it possible to monitor contracts using flight data and not just financial data. For this, the present invention provides a method for predicting wear of a mechanical part, as well as a method for determining the operational risk associated with an aircraft or fleet of aircraft, taking account of the usage profile of each mechanical part, as well as the environmental conditions to which each mechanical part is exposed.

For this, a first aspect of the invention relates to a method for predicting wear of a mechanical part, for example a turbomachine, and the uncertainty associated with this prediction for a given usage profile, the usage profile taking account of a plurality of environmental conditions associated with environmental data as well as the usage time of the mechanical part in each of these environmental conditions, the method comprising:

- a step of determining operational data associated with a plurality of mechanical parts of the same type as the mechanical part under consideration;
- from the operational data determined in the previous step, a step of determining a plurality of models for predicting wear of the part, wherein the mechanical part can be divided into a plurality of elements, each element being modeled using at least one model from the plurality of models;
- for each model of the plurality of models, a step of determining a weighting coefficient as a function of the proximity between the element of the mechanical part and/or the usage profile associated with the operational data used to determine the model under consideration and the element of the mechanical part under consideration and/or the usage profile of the element of the mechanical part under consideration;
- a step of determining wear prediction of the mechanical part under consideration, this prediction being obtained by a weighted average of the predictions made by each of the models of the plurality of models, the prediction made by each model being weighted by the weighting coefficient associated with said model;
- a step of determining a statistical quantity representative of dispersion of the predictions of the plurality of models, the uncertainty of the prediction being established as a function of this statistical quantity.

It is thus possible to predict wear of a mechanical part and the uncertainty associated with this prediction. Furthermore, this prediction takes account of the conditions under which the mechanical part under consideration is operated. Such a prediction can have applications in preventive maintenance or even in the evaluation of costs associated with an aircraft equipped with such a mechanical part, or a fleet of aircraft. Especially, it makes it possible to estimate maintenance costs, engine time under wing, the availability rate of turbomachine or a risk indicator for contracting.

Further to the characteristics just discussed in the preceding paragraph, the method according to a first aspect of the invention may have one or more of the following additional characteristics, considered individually or according to any technically possible combinations.

In one embodiment, the environmental data includes the presence of gravel, presence of salt, presence of sand, exposure to electromagnetic radiation, altitude, thermal amplitude or even pollution.

In one embodiment, the mechanical part is an aircraft mechanical part and the usage profile includes routes travelled by the aircraft including all aeroplane trajectories with stopover locations, on-line maintenance locations or line replaceable unit storage points.

A second aspect of the invention relates to a method for determining the operational risk associated with an aircraft comprising at least one turbomachine, said method comprising:

for each turbomachine, a step of predicting wear of the turbomachine and the uncertainty associated with this prediction, this prediction and the uncertainty associated therewith being determined using a method according to a first aspect of the invention;

a step of determining an operational risk as a function of the wear prediction and uncertainty associated therewith determined for each turbomachine in the previous step.

A third aspect of the invention relates to a method for determining the operational risk associated with a fleet comprising a plurality of aircraft, the method comprising:

for each aircraft in the fleet, a step of determining the operational risk, the operational risk being determined using a method according to a second aspect of the invention;

a step of determining the operational risk associated with the fleet from the operational risk associated with each aircraft in the fleet determined in the previous step.

A fourth aspect of the invention relates to a computer program comprising program code instructions for executing the steps of the method according to a first aspect, a second aspect or a third aspect of the invention when said program is executed on a computer.

A fifth aspect of the invention relates to a computer-readable data medium on which the computer program according to a fourth aspect of the invention is recorded.

The invention and its different applications will be better understood upon reading the following description and upon examining the accompanying figures.

BRIEF DESCRIPTION OF THE FIGURES

The figures are set forth by way of indicating and in no way limiting purposes of the invention.

FIG. 1 illustrates a flow chart of a method according to a first aspect of the invention.

FIG. 2 illustrates a map showing environmental data for different geographical zones.

FIG. 3 illustrates the effects of dust on the operation of a turbomachine.

FIG. 4 illustrates a flow chart of a method according to a second aspect of the invention.

FIG. 5 illustrates a flow chart of a method according to a third aspect of the invention.

DETAILED DESCRIPTION

In the following, the invention will be illustrated by means of one example in which the mechanical part is an aircraft turbomachine. However, the person skilled in the art will be able to adapt the teachings of the present invention to other mechanical parts, for example a landing gear, a flight control surface, a jack, a nacelle, a turbine vane, a compressor vane, a thermal protection, a stiffener, etc. More generally, the present invention can be implemented for any mechanical part having a controlled movement and whose wear is a function of environmental conditions (the notion of environmental conditions will be detailed in the following). Method for Predicting Wear of a Mechanical Part and Uncertainty of this Prediction A first aspect of the invention illustrated in [FIG. 1] relates to a method 100 for predicting wear of a mechanical part and the uncertainty associated with this prediction. As already mentioned, the example of an aircraft turbomachine will be used for illustrative purposes, but the invention can be implemented for other types of mechanical parts, and in particular other mechanical parts of an aircraft.

In the method 100 according to a first aspect of the invention, this determination is made for a given usage profile. This usage profile especially takes account of a plurality of environmental conditions as well as the usage time under each of these environmental conditions.

For this, the method 100 according to the invention comprises a step 1E1 of determining the operational data for a plurality of turbomachines of the same type as the turbomachine of interest (the notion of operational data will be detailed in the following), two turbomachines being of the same type when, for example, they have the same architecture and/or the same thrust range.

The method 100 also comprises, on the basis of the operational data determined in the preceding step 1E1, a step 1E2 of determining a plurality of wear prediction models for the turbomachine, the turbomachine being divisible into a plurality of elements (for example vanes etc.), each element being modeled using at least one model from the plurality of models. In other words, each model of the plurality of models is associated with one and only one element of the turbomachine, but an element may be associated with one or more models of the plurality of models.

The method 100 further comprises, for each model of the plurality of models, a step 1E3 of determining a weighting coefficient as a function of the proximity between the turbomachine element and/or the usage profile associated with the operational data used to determine the model under consideration and the turbomachine element under consideration and/or the usage profile of the turbomachine element under consideration. For example, if the element under consideration is a fan, then the diameter and/or speed of rotation of the fan in relation to the diameter or speed of rotation of the fan used to determine the model can be taken into account in assigning the weighting coefficient. Of course, this is only one example, and different parameters could be taken into account to establish this proximity, for example on the basis of empirical data.

For example, the weighting coefficient associated with the model determined from data relating to a turbomachine element identical to the turbomachine element under consideration (for example a same model of the element as the element under consideration) will be higher than the weighting coefficient associated with the model determined from data relating to a turbomachine element substantially different from the turbomachine element under consideration (for example an element with a different generation from that of the element under consideration).

In the same way, the weighting coefficient associated with the model determined from data relating to a usage profile identical (or very similar) to the usage profile of the turbomachine under consideration (and therefore of the element under consideration) will be higher than the weighting coefficient associated with the model determined from data relating to a usage profile different from the usage profile of the turbomachine under consideration (and therefore of the element under consideration).

The method 100 according to a first aspect of the invention then comprises a step 1E4 of determining wear prediction for the turbomachine under consideration, this prediction being obtained by a weighted average of the predictions made by each of the models of the plurality of models, the prediction made by each model being weighted by the weighting coefficient associated with said model. In one embodiment, the wear prediction takes the form of a failure probability and the weighted average is made on the failure probabilities made by each of the models of the plurality of models.

The method 100 according to a first aspect of the invention also comprises a step 1E5 of determining a statistical quantity representative of the dispersion of the predictions of the plurality of models, the uncertainty of the prediction being established as a function of this statistical quantity. In one exemplary embodiment, the representative statistical quantity is the standard deviation (or variance) or the 3 sigma dispersion (3σ).

Environmental Data, Environmental Conditions and Usage Profile

Environmental Data

In one embodiment, environmental data includes the presence of gravel, presence of salt, presence of sand, exposure to electromagnetic radiation (DUV), altitude, thermal amplitude or even pollution. For example, the presence of sand can be represented by the probability of a grain of sand entering the engine and/or the concentration of sand as a function of the sand grain size. Indeed, the turbomachine of an aeroplane operating domestic flights will be less exposed to salt than the turbomachine of an aeroplane operating onshore. Similarly, if the aeroplane operates in a desert environment, the turbomachine will be more exposed to sand than the turbomachine of an aeroplane operating outside such a zone. It is therefore important to take account not only of the environmental data to which the turbomachine is exposed, but also of the exposure time. By way of illustration, [FIG. 2] shows different environmental conditions depending on the geographical zone under consideration, and [FIG. 3] shows the potential impact of a dust-rich environment on turbomachine operation. It is worth noting that not all turbomachine elements will be equally exposed to these different environmental conditions.

Environmental Conditions

Several environmental conditions may be present at the same time. For example, a flight by the sea in a desert zone will gather environmental data associated with the presence of sand and environmental data associated with the presence of salt. These different environmental data will be gathered in the form of environmental conditions, each environmental condition corresponding to an environmental condition of use of the turbomachine.

Usage Profile

In one embodiment, the usage profile includes routes used by the aeroplane (and therefore the turbomachine mounted thereto), especially detailing all aeroplane trajectories with stopover locations, online maintenance locations or line replaceable unit (LRU) storage points. From this information, it is therefore possible to trace back to the environmental conditions to which the turbomachine has been exposed, as well as the duration of exposure to each of these environmental conditions.

In one exemplary embodiment, the usage profile includes schedules, for example commercial operation schedules, including, in addition to the routes already discussed, maintenance operations carried out.

In one embodiment, the usage profile includes the maintenance strategy, for example the prioritisation criteria between maintenance and continuity of operations, the latter being variable according to the season, fuel costs or the state of the engine fleet.

Operational Data

As already mentioned, operational data can be derived from the operation of a turbomachine of the same type, that is the same model, a previous-generation model or a model with the same technical characteristics. Furthermore, each item of operational data can be linked to a usage profile. For example, if the operational data are derived from the operation of a plurality of turbomachines, the operational data derived from each turbomachine of the plurality of turbomachines can be associated with the usage profile of said turbomachine. This means that, when a predictive model associated with an element has been determined from the operational data of a given turbomachine, it is possible to associate a usage profile with the model thus determined.

In the case of an aircraft turbomachine (or indeed any aircraft part), operational data may come from usage history data for fleets in service, "public" data such as Flight Radar, data from repair shops, or predictions for turbomachines not yet deployed (that is not yet in service).

In one embodiment, the operational data comprises the time under wing of the turbomachine. In one exemplary embodiment, this time under wing takes account of at least one of the following indicators: the number of starts and aborted starts (e.g. through the number of fuel injections into the chamber), the time spent at idle or higher rpm, or periods beyond a threshold number of days (for example four days) when the turbomachine has not been used (corresponding to periods during which turbomachine preservation has been necessary).

In one embodiment, the operational data comprises the turbomachine availability rate. In one embodiment, this availability rate takes account of the rate of successful starts, that is the ratio between the number of successful starts and the number of start attempts (a rate equal to one therefore corresponds to a case where every start attempt results in a start, that is a case where the number of starts is equal to the number of start attempts).

In one embodiment, the availability rate is determined as a function of the Mean Time Between Failure (MTBF), the Mean Time to Repair (MTTR) and/or the Mean Time Between Repair (MTBR).

In one embodiment, the operational data comprises manufacturer data. In an embodiment, these manufacturer data comprise:
  user feedback relating to the same type of turbomachine as the turbomachine of interest, especially flight data and maintenance data (on-line, repair shop, etc.);
  user feedback relating to turbomachines of similar types (e.g. previous generation) to the turbomachine of interest.

In one embodiment, manufacturer data includes repair shop schedules, engine key performance indicators (or engine KPIs), said indicators comprising: engine availability rates, availability rates (Aircraft On Ground (AOG), Delay and Canceled (D&C), In Flight Shutdown (IFSD)), Direct Operation Costs (DOC), Direct Maintenance Costs (DMC), and the sensitivity of these costs to missions and the operating environment.

In one embodiment, engine operating costs include the cost of fuel consumed and/or the cost of line maintenance. In one embodiment, direct maintenance costs include the cost of heavy maintenance including parts and labour.

Determining the Plurality of Models

Determining a plurality of models is made from operational data as described above. This plurality of models may include one or more vibratory models, one or more thermal models, one or more sand aggression models, one or more global maintenance models, one or more models related to production faults, etc. It is also made based on estimators that measure the predictive quality of each model. As a reminder, each model is associated with one turbomachine element, but one element can be associated with several models. For example, a vane may be associated with a first wear model corresponding to the presence of sand and a second wear model corresponding to the operating temperature, for example the take-off temperature.

To this end, step 1E2 of determining a plurality of prediction models comprises a first sub-step of selecting a data set from the operational data. For example, the data set could be selected by means of an operational analysis, identifying physical quantities that enable the element to operate or have an impact on this operation (inputs) and on which the element acts (outputs).

It then comprises a sub-step of clustering the data in the dataset. In one embodiment, this clustering itself comprises two sub-steps.

More particularly, it first comprises a sub-step of firstly clustering the data, the first plurality of clusters obtained being intended for the determination of the plurality of estimators. One example of an estimator is an indicator relating to in-flight ice formation. In order to determine such an estimator, it is not necessary to take account of all the operational data, but only those relating to ice formation (in-flight temperature, humidity, etc.). Thus, during this first clustering, several data aggregates are obtained, each data aggregate being specific to one or more estimators.

It then comprises a sub-step of secondly clustering data, the second plurality of clusters obtained being intended for determining the plurality of predictive models. One example of a predictive model may be relative to a vane and relate to the determination of a scaling probability as a function of temperature. In order to determine such a model, it is not necessary to take all the operational data into account, but only those relating to the temperature to which the vane is exposed. Thus, during this second clustering, several data aggregates are obtained, each data aggregate being specific to one or more models.

Step 1E2 of determining a plurality of prediction models then comprises a sub-step of determining, from the clusters of the first plurality of clusters, an estimator for each cluster of the first plurality of clusters.

It then comprises a sub-step of determining, from the plurality of indicators and the clusters of the second plurality of clusters, the plurality of predictive models.

It also includes a sub-step of determining a reliability indicator for the prediction obtained using the plurality of predictive models.

Finally, it includes a sub-step of comparing the prediction obtained with test data, the preceding sub-steps being repeated as long as the difference between the prediction and the test data is greater than a given threshold, the data set being refined during each iteration so as to approximate the usage profile of the turbomachine whose wear is sought to be predicted.

Determining the Operational Risk of an Aircraft

A second aspect of the invention illustrated in [FIG. 4] relates to a method 200 for determining the operational risk associated with an aircraft comprising at least one turbomachine. By operational risk, it is meant the occurrence of an operating incident such as the lighting up of a warning light, a breakdown, a triggered maintenance operation, etc.

For this, the method 200 according to a second aspect of the invention comprises, for each turbomachine, a step 2E1 of predicting wear of the turbomachine and the uncertainty associated with this prediction, this prediction and the uncertainty associated therewith being determined using a method 100 according to the preceding claim.

More particularly, routes taken by the aircraft are used to establish a usage profile and thus to determine, for each turbomachine of the aircraft and using a method according to a first aspect of the invention, a prediction of turbomachine wear and an uncertainty associated with this prediction. The information relating to an aircraft route can especially include all trajectories with stopover locations, line maintenance locations as well as storage points.

The method 200 according to a second aspect of the invention also includes a step 2E2 of determining an operational risk as a function of the wear prediction and uncertainty associated therewith determined for each turbomachine in the previous step 2E1. In one embodiment, the wear prediction takes the form of a failure prediction.

Determining the Operational Risk of a Fleet of Aircraft

A third aspect of the invention relates to a method 300 for determining the operational risk associated with a fleet comprising a plurality of aircraft. For this, the method 300 comprises, for each aircraft in the fleet, a step 3E1 of determining the operational risk, the operational risk being determined using a method 200 according to the preceding claim.

The method 300 also comprises a step 3E2 of determining the operational risk associated with the fleet from the operational risk associated with each aircraft in the fleet determined in the previous step 3E1.

The invention claimed is:

1. A method for performing a preventive maintenance operation on an mechanical part of an aircraft based on predicted wear of the mechanical part and associated uncertainty for a given usage profile, the usage profile taking account of a plurality of environmental conditions associated with environmental data as well as a usage time of the mechanical part in each of said plurality of environmental conditions, the method comprising:
  a step of determining operational data associated with a plurality of mechanical parts of a same type as the mechanical part under consideration;
  from the operational data determined in the preceding step, a step of determining a plurality of wear prediction models for the part, the mechanical part being divisible into a plurality of elements, each element being modeled using at least one model from the plurality of models;
  for each model of the plurality of models, a step of determining a weighting coefficient as a function of the proximity between the element of the mechanical part and/or the usage profile associated with the operational data used to determine the model under consideration and the element of the mechanical part under consideration and/or the usage profile of the element of the mechanical part under consideration;
  a step of determining wear prediction of the mechanical part under consideration, said prediction being obtained by a weighted average of the predictions made by each of the models of the plurality of models, the prediction performed by each model being weighted by the weighting coefficient associated with said model;
  a step of determining a statistical quantity representative of dispersion of the predictions of the plurality of models, the uncertainty of the prediction being established as a function of this statistical quantity, and
  a step of performing the preventive maintenance operation on the mechanical part using the wear prediction and the uncertainty associated therewith before a failure event related to the mechanical part occurs.

2. The method according to claim 1, wherein the environmental data comprise a presence of gravel, presence of salt, presence of sand, exposure to electromagnetic radiation, altitude, thermal amplitude or pollution.

3. The method according to claim 1, wherein the mechanical part is an aircraft mechanical part and wherein the usage profile comprises routes travelled by the aircraft including all aircraft trajectories with stopover locations, line maintenance locations or even line replaceable unit storage points.

4. A method for determining an operational risk associated with an aircraft comprising at least one turbomachine, said method comprising:
for each turbomachine, a step of predicting wear of the turbomachine and the uncertainty associated with said prediction;
a step for determining an operational risk as a function of the wear prediction and uncertainty associated therewith determined for each turbomachine in the preceding step, and
a step of performing a preventive maintenance operation on the turbomachine based on the predicted wear of the turbomachine and said associated uncertainty using the method according to claim 1.

5. A method for determining an operational risk associated with a fleet comprising a plurality of aircraft, the method comprising:
for each aircraft in the fleet, a step of determining the operational risk, the operational risk being determined using a method according to claim 4;
a step of determining the operational risk associated with the fleet from the operational risk associated with each aircraft in the fleet determined in the previous step.

6. A non-transitory computer-readable data medium coded with instructions for executing the steps of the method according to claim 1.

7. The method according to claim 1, wherein the mechanical part is a turbomachine of an aircraft in a fleet of aircrafts.

* * * * *